United States Patent Office 3,380,982
Patented Apr. 30, 1968

3,380,982
METHOD FOR FORMATION OF THREE-DIMENSIONAL STRUCTURES IN SATURATED CARBON CHAIN POLYMERS
Alfred Anisimovich Berlin, Moscow, and Ljubov Anatoljevna Dudnik, Serpukhov, U.S.S.R., assignors to Institute Khimicheskoi Fiziki, Moscow, U.S.S.R.
No Drawing. Filed Nov. 16, 1964, Ser. No. 411,564
16 Claims. (Cl. 260—93.7)

The present invention relates to methods of three-dimensional structure formation in carbon chain polymers free of double bonds (e.g., polyethylene, polypropylene and their copolymers, polyvinyl alcohol etc.).

The formation of a three-dimensional structure in carbon chain polymers permits to get materials characterized by the absence of cold yielding and by improved thermal stability, improved resistance to solvents, oils, chemical agents and to aging.

Methods of three-dimensional structure formation in saturated carbon chain polymers, for example in polyolefines, are known. These methods are based on adding peroxides or some chlorine derivatives to polymers, or on high energy radiation treatment of polymers. All these methods cannot be extensively used in industry due to the difficulties encountered in using explosive peroxides or chlorine derivatives causing corrosion of machinery and because of the necessity to use complex high energy radiation equipment.

Another disadvantage of the known methods is the insufficient stability of the resulting three-dimensional polymer structures. To improve their stability different stabilizers are added to these polymers, but even these stabilizers do not prevent aging of the polymers due to the remaining free peroxides.

The attempts to eliminate the above mentioned difficulties and disadvantages did not give any results, while we have successfully solved this problem and brought it to practical realization.

Our invention in a broad sense relates to the process of conversion of carbon chain polymers free of double bonds into polymers having three-dimensional structure.

The object of the invention is to develop a simple process of three-dimensional structure formation in carbon chain polymers which would make it possible to obtain products of improved electrical, mechanical and physicochemical characteristics.

Another object of the invention is to develop a process of producing three-dimensional polymer systems characterized by improved stability from carbon chain polymers without introducing special stabilizing agents into the polymers.

We propose a process of three-dimensional structure formation in saturated carbon chain polymers by way of thermochemical treatment of saturated polymers in the presence of quinones.

It is necessary to use the quinones with a redoxy potential not lower than 0.65 volt (tetrachloro-quinone, n-benzo-quinone, o-benzo-quinone, 2,5-dichloro-quinone, 2,-6-dichloro-quinone, 2-chloro-quinone, 2,3-dichloro-5,6-dicyan-quinone, tetracyan-quinone, dipheno-quinone).

Dehydrogenation action of the above-mentioned quinones in case of carbon chain polymers differs in principle from their interaction with saturated low molecular weight compounds.

The high activity of quinones, which we have found in case of such carbon chain polymers as polyethylene, polypropylene, polyvinyl alcohol, is caused by the fact that in the macro-molecules there are, or can easily be formed, allyl end groups, in which hydrogen situated at $\alpha$-carbon atoms is highly mobile.

In carrying out the process the solution or the dispersion of a certain saturated polymer with a quinone (8–12 percent by weight) in an organic solvent is heated in an inert gas atmosphere. The reaction is carried out in an autoclave at the boiling point of the solvent with continuous stirring at the normal pressure or under an elevated pressure. The obtained polymeric material is then subjected to pressing at about 200° C. and a pressure of 100 kg. per sq. cm. for converting the polymer into a three-dimensional non-soluble structure.

In carrying out the process it is also possible to mix saturated carbon chain polymers with a quinone (one of the said quinones or a mixture of two quinones), the latter being taken in the amount of 5–8 percent by weight of the polymer, and to treat the mixture at 150–200° C. It is possible to carry out the heat treatment by any known method (pressing, extrusion, rolling, etc.).

The use of quinones does not cause any technological difficulties in production. On the contrary, the hydroquinone formed during the reaction and the unreacted quinone act as stabilizers ensuring the safety of the process and improving the thermal stability of the resulting polymers.

For better understanding of the invention by those skilled in the art the following examples are given.

EXAMPLE 1

Into a flask equipped with a stirrer, a reflux condenser and a thermometer equal amounts (by weight) of polyethylene and tetrachloro-quinone, and a three- or fourfold amount of o-xylene are charged. The reaction is carried out at 144.5° C. for 8 hours at continuous stirring. The resulting brown product is soluble in aromatic and chlorinated hydrocarbons, its degree of dehydrogenation is 10.5–15 percent. The resulting product is easily pressed into a monolithic plastic at 200° C. and a pressure of 100 kg. per sq. cm.

The thermomechanical studies show that the plastic produced from the polymer is of a three-dimensional structure. It is non soluble in all known solvents and does not decompose up to 350° C.

EXAMPLE 2

0.1 part by weight of polyethylene (molecular weight is 220,000), 1 part by weight of tetrachloro-quinone and 3–5 parts by weight of o-xylene are charged into an autoclave equipped with a stirrer. The mixture is heated to 200° C. and the reaction is carried out under o-xylene vapour pressure for 4 hours.

The resulting black product is non-soluble, it has $0.9 \times 10^{18}$ paramagnetic particles per gram, its specific electrical conductivity at $10^{-11}$ ohm$^{-1}$ cm.$^{-1}$ at 20° C. and activation energy of conductivity is 0.15 ev./mol. The yield of the product is 80 percent and above. The product is easily pressed into a monolithic plastic at 200° C. and a pressure of 100 kg. per sq. cm. Thermo-mechanical studies show that plastics produced from the polymer have a three-dimensional structure. The polymer is non-soluble in all known solvents and does not decompose up to 350° C.

EXAMPLE 3

One part by weight of polyethylene (molecular weight is 220,000), 0.7 part by weight of dipheno-quinone and 3 parts by weight of o-xylene are charged into the said flask. The reaction is carried out as in Example 1. The resulting plastic is similar to that produced in Example 1.

EXAMPLE 4

The process is carried out as in Example 1 but n-benzoquinone is used instead of tetrachloro-quinone.

EXAMPLE 5

The process is carried out as in Example 1, but o-benzo-quinone is used instead of tetrachloro-quinone.

EXAMPLE 6

The process is carried out as in Example 1, but 2,5-dichloro-quinone is used instead of tetrachloro-quinone.

EXAMPLE 7

The process is carried out as in Example 1, but 2,6-dichloro-quinone is used instead of tetrachloro-quinone.

EXAMPLE 8

The process is carried out as in Example 1, but 2-chloro-quinone is used instead of tetrachloro-quinone.

EXAMPLE 9

The process is carried out as in Example 1, but 2,5-dichloro-3,6-dicyan-quinone is used instead of tetrachloro-quinone.

EXAMPLE 10

The process is carried out as in Example I, but tetracyan-quinone is used instead of tetrachloro-quinone.

EXAMPLE 11

The process is carried out as in Example 2, but n-benzo-quinone is used instead of tetrachloro-quinone.

EXAMPLE 12

The process is carried out as in Example 2, but o-benzo-quinone is used instead of tetrachloro-quinone.

EXAMPLE 13

The process is carried out as in Example 2, but dipheno-quinone is used instead of tetrachloro-quinone.

EXAMPLE 14

The process is carried out as in Example 1, but the mixture of tetrachloro-quinone and dipheno-quinone in a ratio of 1:1 is used instead of tetrachloro-quinone.

EXAMPLE 15

The process is carried out as in Example 2, but the mixture of tetrachloro-quinone and dipheno-quinone in a ratio of 1:1 is used instead of tetrachloro-quinone.

EXAMPLE 16

0.13 part by weight of tetrachloro-quinone and 1 part by weight of o-xylene are charged into a flask equipped with a stirrer, a reflux condenser, a thermometer and a barbotage tube. The resulting quinone solution is heated and the suspension of polyvinyl alcohol in o-xylene is added to the hot solution (one part by weight of polyvinyl alcohol and 4 parts by weight of o-xylene). The temperature of the reaction mixture is raised to 144.5° C. with accompanying continuous stirring and blowing of the system with nitrogen. In 8 hours a black product containing carbonylic and hydroxylic groups as well as double bonds is obtained. The product is easily pressed at 200° C. and changes into a strong plastic of three-dimensional structure.

EXAMPLE 17

The process is carried out as in Example 16, but n-benzo-quinone is used instead of tetrachloro-quinone.

EXAMPLE 18

The process is carried out as in Example 16, but 2,6-dichloro-quinone is used instead of tetrachloro-quinone.

EXAMPLE 19

The process is carried out as in Example 16, but dipheno-quinone is used instead of tetrachloro-quinone.

EXAMPLE 20

The process is carried out as in Example 16, but the mixture of tetrachloro-quinone and tetracyan-quinone taken in a ratio of 1:1 is used instead of tetrachloro-quinone.

EXAMPLE 21

The mixture of one part by weight of polyethylene (molecular weight is 220,000) and 0.05 part by weight of tetrachloro-quinone is pressed in a moulding press at 200° C. and a pressure of 100 kg. per sq. cm. The resulting strong monolithic plastic does not soften up to 350° C. and after exposure at 300° C. for 12 hours it loses only 10–15% of its initial weight. The polymer is practically insoluble in organic solvents, oils and liquid fuels.

EXAMPLE 22

The process is carried out as in Example 21, but 2,3-dichloro-5,6-dicyan-quinone is used instead of tetrachloro-quinone.

EXAMPLE 23

The process is carried out as in Example 21, but dipheno-quinone is used instead of tetrachloro-quinone.

EXAMPLE 24

The process is carried out as in Example 21, but the mixture of tetrachloro-quinone and dipheno-quinone in a ratio of 1:1 is used instead of tetrachloro-quinone.

EXAMPLE 25

The mixture of 1 part by weight of polypropylene (molecular weight is 130,000) and 0.1 part by weight of dichloro-quinone is pressed in a moulding press at 200° C. and a pressure of 100 kg. per sq. cm. The resulting plastic is insoluble in all known organic solvents and does not soften up to 300° C.

EXAMPLE 26

The process is carried out as in Example 25, but 2-chloro-quinone is used instead of 2,5-dichloro-quinone.

EXAMPLE 27

The process is carried out as in Example 25, but the mixture of n-benzo-quinone and tetracyan-quinone in a ratio of 1:1 is used instead of 2,5-dichloro-quinone.

EXAMPLE 28

The mixture of one part by weight of polyethylene (molecular weight is 40,000) and 0.05 part by weight of tetracyan-quinone is pressed at 150° C. and a pressure of 100 kg. per sq. cm. The resulting polymeric material is strong, non-fusible and non-soluble.

EXAMPLE 29

The process is carried out as in Example 28, but the mixture of tetrachloro-quinone and dipheno-quinone in a ratio of 0.7:0.3 is used instead of tetracyan-quinone.

EXAMPLE 30

An elastic copolymer of ethylene and propylene (1 part by weight) is mixed with dipheno-quinone (0.05 part by weight). The resulting mixture is subjected to heat treatment at 150° C. (rolling, pressing, extrusion). The resulting polymer of three-dimensional structure is non-soluble in all known solvents and does not soften up to 300° C.

EXAMPLE 31

The process is carried out as in Example 30, but n-benzo-quinone is used instead of dipheno-quinone.

EXAMPLE 32

The process is carried out as in Example 30, but the mixture of tetrachloro-quinone and 2-chloro-quinone in a ratio of 0.6:0.4 is used instead of dipheno-quinone.

What we claim is:

1. A method for formation of three-dimensional structures in saturated carbon chain polymers, particularly in polyolefines, consisting in mixing polymers with a mixture of two quinones having a redoxy potential not lower than 0.65 volt, selected from the group consisting of tetrachloro-quinone, n-benzo-quinone, o-benzo-quinone, 2,5-dichloro-quinone, 2,6 - dichloro - quinone, 2-chloro-quinone, 2,3-dichloro-5,6-dicyan-quinone, tetracyan-quinone, dipheno-quinone, the resulting mixtures being then subjected to heat treatment at 150–200° C.

2. A method according to claim 1, wherein the heat treatment is carried out by pressing at 150–200° C. and a pressure of 100 kg. per sq. cm.

3. A method according to claim 1, wherein the heat treatment is carried out by rolling at 150–200° C.

4. A method according to claim 1, wherein the heat treatment is carried out by extrusion at 150–200° C.

5. A method for formation of three-dimensional structures in saturated carbon chain polymers, consisting in mixing solutions of a polymer and two quinones having a redoxy potential not lower than 0.65 volt and selected from the group consisting of tetrachloro-quinone, n-benzo-quinone, o-benzo-quinone, 2,5-dichloro-quinone, 2,6-dichloro-quinone, 2-chloro-quinone, 2,3-dichloro - 5,6 - dicyan - quinone, tetracyan - quinone, dipheno-quinone, the resulting mixture being kept for 8 hours in a reactor at the boiling point of an inert solvent at the atmospheric pressure, followed by heat treatment at 150–200° C.

6. A method according to claim 5, wherein the heat treatment is carried out by pressing at 150–200° C.

7. A method according to claim 5, wherein the heat treatment is carried out by extrusion at 150–200° C.

8. A method according to claim 5, wherein the heat treatment is carried out by rolling at 150–200° C.

9. A method for formation of three-dimensional structures in saturated carbon chain polymers, consisting in mixing solutions of a polymer and two quinones having a redoxy potential not lower than 0.65 volt and selected from the group consisting of tetrachloro-quinone, n-benzo-quinone, o-benzo-quinone, 2,5-dichloro-quinone, 2,6-dichloro-quinone, 2-chloro-quinone, 2,3-dichloro-5,6-dicyan-quinone, tetracyan-quinone, dipheno-quinone, the resulting mixture being kept for 4 hours at the boiling point of the solvent and under pressure followed by heat treatment at 150–200° C.

10. A method according to claim 9, wherein the heat treatment is carried out by pressing at 150–200° C.

11. A method according to claim 9, wherein the heat treatment is carried out by rolling at 150–200° C.

12. A method according to claim 9, wherein the heat treatment is carried out by extrusion at 150–200° C.

13. A method for formation of three-dimensional structures in carbon chain polymers which consists in mixing polymer suspensions in an inert solvent with a mixture of two quinones having a redoxy potential not lower than 0.65 volt and selected from the group consisting of tetrachloro-quinone, n-benzo-quinone, o-benzo-quinone, 2,5-dichloro-quinone, 2,6-dichloro-quinone, 2,3-dichloro-5,6-dicyan-quinone, tetracyan-quinone, dipheno-quinone etc., the resulting mixture being kept for 8 hours in a reactor in an inert gas atmosphere at the normal pressure and the boiling point of the solvent followed by heat treatment at 150–200° C.

14. A method according to claim 13, wherein the heat treatment is carried out by pressing at 150–200° C.

15. A method according to claim 13, wherein the heat treatment is carried out by rolling at 150–200° C.

16. A method according to claim 13, wherein the heat treatment is carried out by extrusion at 150–200° C.

References Cited

UNITED STATES PATENTS 3,285,883   11/1966   Shepherd _____ 260—94.9

JOSEPH L. SCHOFER, *Primary Examiner.*

L. EDELMAN, *Assistant Examiner.*